(12) United States Patent
Correia et al.

(10) Patent No.: US 7,524,260 B2
(45) Date of Patent: Apr. 28, 2009

(54) DRIVE AXLE WITH INTERNAL AIR SHIFT MECHANISM

(75) Inventors: Egidio Miguel Gomes Correia, Sao Paulo (BR); Jose Gumercindo Furtado, Osasco (BR); Juscelino Dos Reis, Sao Paulo (BR); Jose Francivaldo Pereira Lemos, Juazeiro do Norte (BR); Fernando Gregorato Martinez, Sao Paulo (BR); Jose Renan da Silva, Osasco (BR)

(73) Assignee: ArvinMeritor Technology, LLC, Troy, MI (US)

( * ) Notice: Subject to any disclaimer, the term of this patent is extended or adjusted under 35 U.S.C. 154(b) by 378 days.

(21) Appl. No.: 11/453,209

(22) Filed: Jun. 14, 2006

(65) Prior Publication Data

US 2007/0293364 A1 Dec. 20, 2007

(51) Int. Cl.
F16H 3/44 (2006.01)
(52) U.S. Cl. ......................... 475/300; 475/86; 192/85 A
(58) Field of Classification Search ........................ None
See application file for complete search history.

(56) References Cited

U.S. PATENT DOCUMENTS

| | | | | |
|---|---|---|---|---|
| 2,803,149 A | * | 8/1957 | Pringle | 475/86 |
| 3,146,842 A | * | 9/1964 | Nelson et al. | 180/24.09 |
| 3,221,832 A | * | 12/1965 | Holmstrom | 180/247 |
| 3,668,794 A | * | 6/1972 | Marquardt et al. | 37/423 |
| 5,085,304 A | * | 2/1992 | Barroso | 192/69.41 |
| 5,257,682 A | * | 11/1993 | Kuroki | 192/88 A |
| 5,413,201 A | * | 5/1995 | Vidal | 192/69.41 |
| 5,535,869 A | * | 7/1996 | Bigley et al. | 192/69.41 |
| 2004/0087408 A1 | * | 5/2004 | Ziech et al. | 475/222 |
| 2008/0085803 A1 | * | 4/2008 | Claussen et al. | 475/220 |

* cited by examiner

Primary Examiner—Sherry Estremsky
(74) Attorney, Agent, or Firm—Carlson, Gaskey & Olds PC

(57) ABSTRACT

An air actuated shift mechanism is housed within a drive axle housing and can be used to actuate a two-speed shifter, or it can be used to actuate a differential locking mechanism. The air actuated shift mechanism includes a lock member and an engageable member that is selectively engaged by the lock member. When the lock member and engageable member are in an engaged position, a first axle function is provided such as a low speed or a locked differential condition. When the lock member and the engageable member are in a disengaged position, a second axle function is provided such as a high speed or an unlocked differential condition. A shift member moves one of the lock member and the engageable member to provide the engaged position, and an air actuated piston controls movement of the shift member.

21 Claims, 5 Drawing Sheets

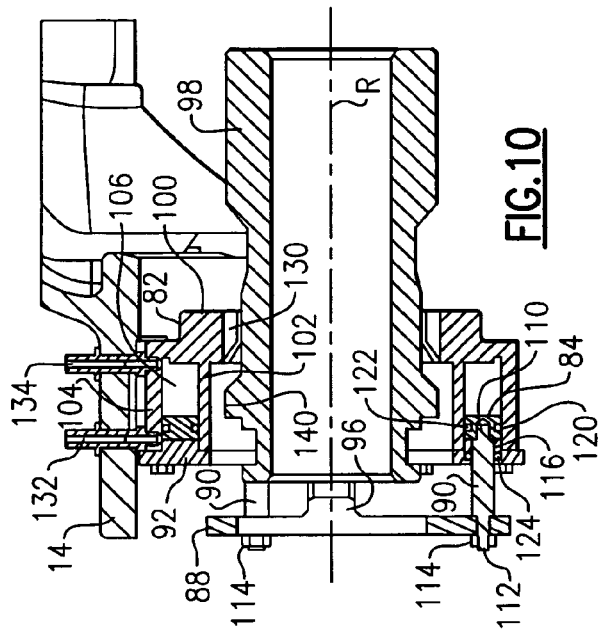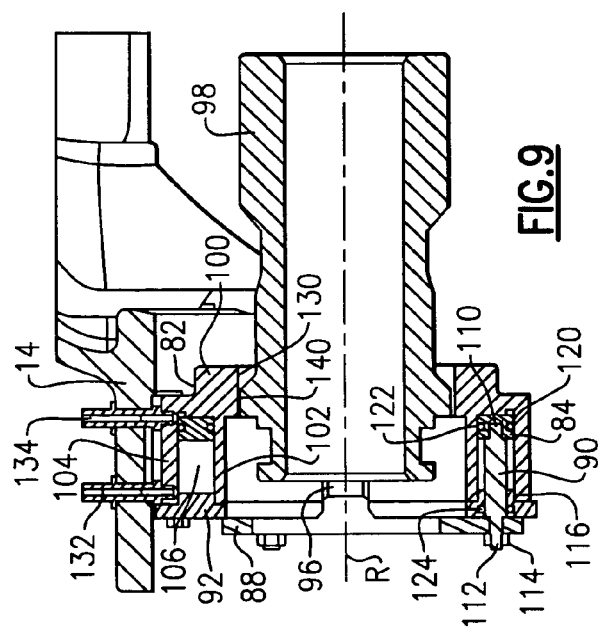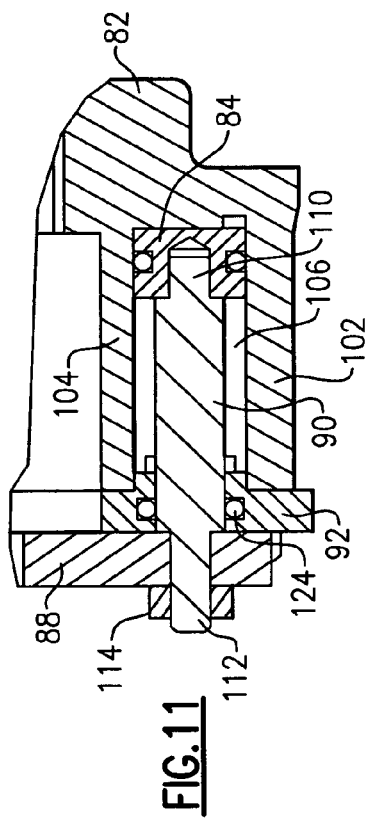

US 7,524,260 B2

DRIVE AXLE WITH INTERNAL AIR SHIFT MECHANISM

TECHNICAL FIELD

The subject invention relates to an air actuated shift mechanism that is used for speed shifting or differential locking, and which is housed within an axle housing for a drive axle.

BACKGROUND OF THE INVENTION

A drive axle includes a drive gear assembly that receives driving input from a driveline component such as a driveshaft, for example. The drive gear assembly forms part of a carrier that is mounted to an axle housing. The drive gear assembly is operably coupled to drive axle shafts, which in turn drive wheels positioned at opposing ends of the axle housing.

Different features can be incorporated into the drive axle to provide desired drive output capabilities. For example, the drive axle can include a two-speed shifter that cooperates with the drive gear assembly to provide high and low speed outputs. In another example, the drive axle includes a differential locking mechanism that allows the axle shafts and differential gearing to be locked together.

The two-speed shifter and the differential locking mechanism are controlled via air actuated shift mechanisms. Traditionally, the air actuated shift mechanism has been positioned external to, i.e. outside of, the axle housing. This mounting configuration takes up valuable packaging space and can result in interference with other vehicle components. Another disadvantage with current air actuated shift mechanisms is the complexity of design and the large number of components.

Thus, there is a need for a simplified air actuated shift mechanism that reduces the number of components, and which can be incorporated inside the axle housing.

SUMMARY OF THE INVENTION

A unique air actuated shift mechanism that is housed within a drive axle housing is used for speed shifting or differential locking. The air actuated shift mechanism includes a lock member that has an engaged position and a disengaged position, and an engageable member that is selectively engaged by the lock member. When in the engaged position the air actuated shift mechanism provides a first axle function, and when in the disengaged position the air actuated shift mechanism provides a second axle function that is different from the first axle function. A shift member moves one of the lock member and the engageable member to provide the engaged position, and an air actuated piston controls movement of the shift member.

In one example, the air actuated shift mechanism is utilized for a two-speed shifter. The lock member comprises a lock plate that is supported by the axle housing, and which includes an air chamber that receives the air actuated piston. The engageable member comprises a sun gear that is selectively engaged and disengaged with the lock plate by the shift member to provide low speed and high speed output capability.

In another example, the air actuated shift mechanism is utilized for a differential locking mechanism. The lock member comprises a shift collar and the engageable member comprises a differential case. A cylinder is supported by the axle housing and includes an air chamber that receives the air actuated piston. When the air chamber is pressurized, the air actuated piston moves the shift member, which moves the shift collar into locking engagement with the differential case to provide a locked differential condition. When the air chamber is not pressurized, a biasing member holds the shift collar in a disengaged position to provide an unlocked differential condition.

The unique air actuated shift mechanism increases packaging space for other vehicle components due to its location within the axle housing. Further, the subject air actuated shift mechanism includes fewer components than previous designs, resulting in decreased costs and assembly time. These and other features of the present invention can be best understood from the following specification and drawings, the following of which is a brief description.

BRIEF DESCRIPTION OF THE DRAWINGS

FIG. 9 is a cross-sectional view of the two-speed shifter of FIGS. 7-8 in a first position.

FIG. 10 is a cross-sectional view of the two-speed shifter of FIG. 9 in a second position.

FIG. 11 is a magnified cross-sectional view of a portion of the air actuated shift mechanism of FIGS. 9-10.

DETAILED DESCRIPTION OF THE PREFERRED EMBODIMENT

Figure 1:
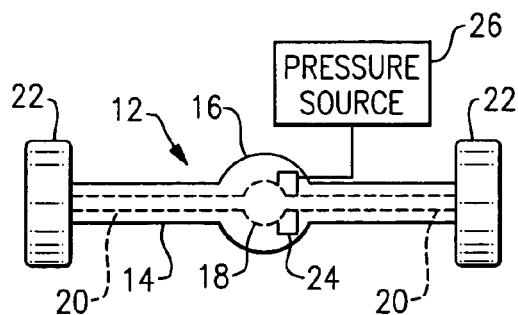
FIG. 1 is a schematic view of a drive axle assembly incorporating the subject invention.

FIG. 1 shows a drive axle assembly 12 including an axle housing 14 and a carrier 16. The carrier 16 includes a drive gear assembly 18 that is coupled to axle shafts 20 as known. The axle shafts 20 drive laterally spaced wheels 22 that are positioned at opposing ends of the axle housing 14. A shift mechanism 24 cooperates with the drive gear assembly 18 to provide different output capabilities for the drive axle assembly 12. The shift mechanism 24 is air actuated and is coupled to a pressure source 26.

Figure 3:
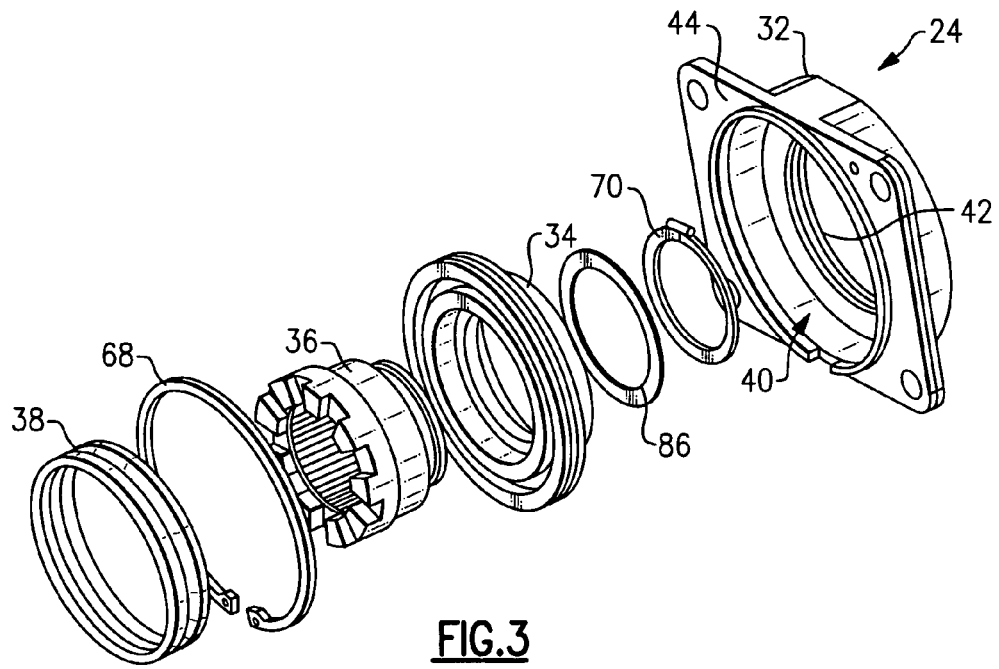
FIG. 3 is an exploded view of the air actuated shift mechanism of FIG. 2.
Figure 2:
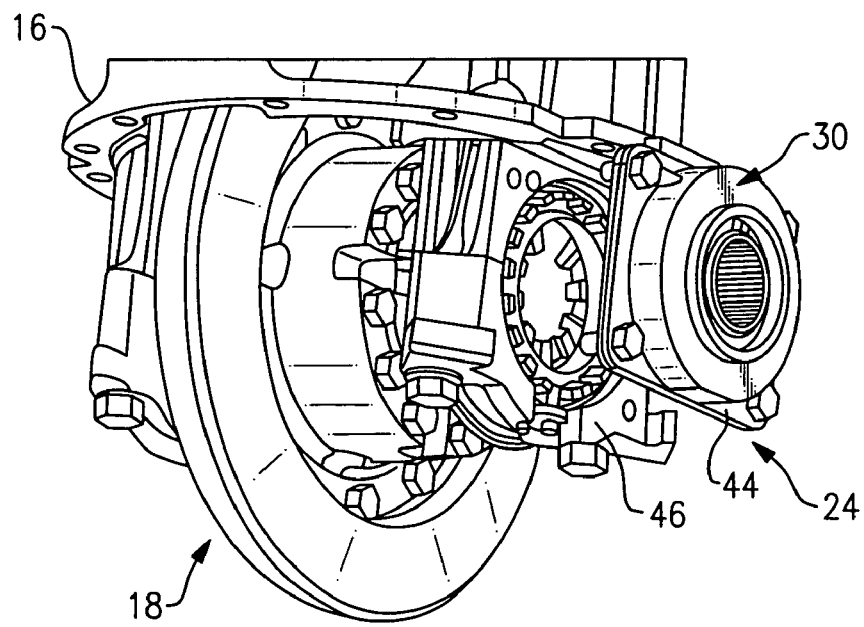
FIG. 2 is a perspective view of a carrier and a first example of an air actuated shift mechanism incorporating the subject invention for a differential.

In the example shown in FIGS. 2-6, the shift mechanism 24 is used to actuate a differential lock mechanism 30 (FIG. 2). As shown in FIG. 3, the shift mechanism 24 for the differential lock mechanism 30 includes a cylinder 32, a piston 34, a shift collar 36, and a resilient member 38, such as a spring for example. The cylinder 32 defines an air chamber 40 that receives the piston 34. The cylinder 32 comprises a cup-shaped member having an opening 42 that surrounds one axle shaft 20 (FIG. 1), and includes a mounting flange portion 44 that is attached to a component 46 (FIG. 2) inside the carrier 16. Thus, shift mechanism 24 is completely enclosed within the axle housing 14.

Figure 6:
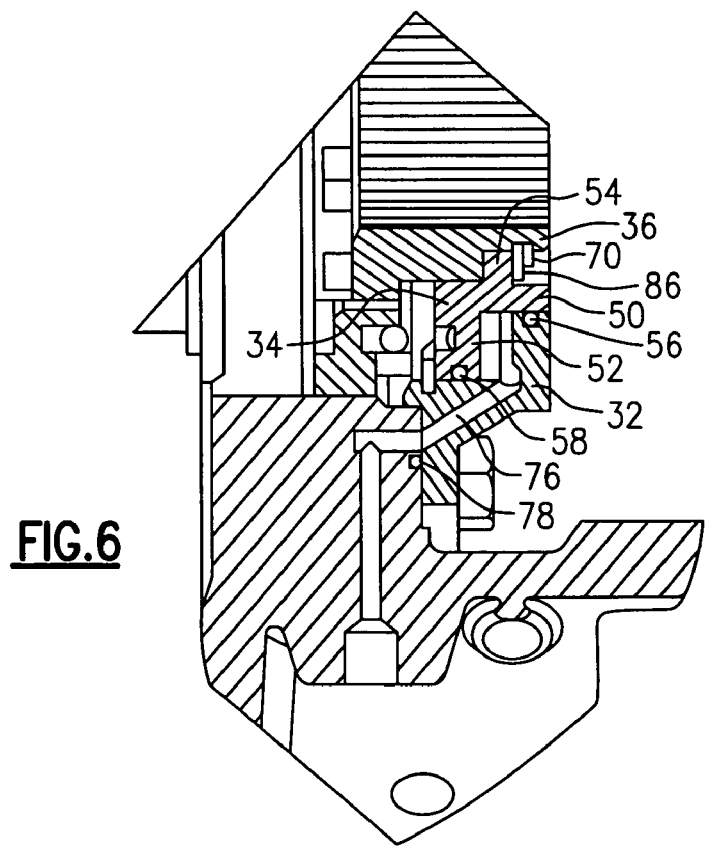
FIG. 6 is a magnified cross-sectional view of a portion of the air actuated shift mechanism showing an air passage.
Figure 5:
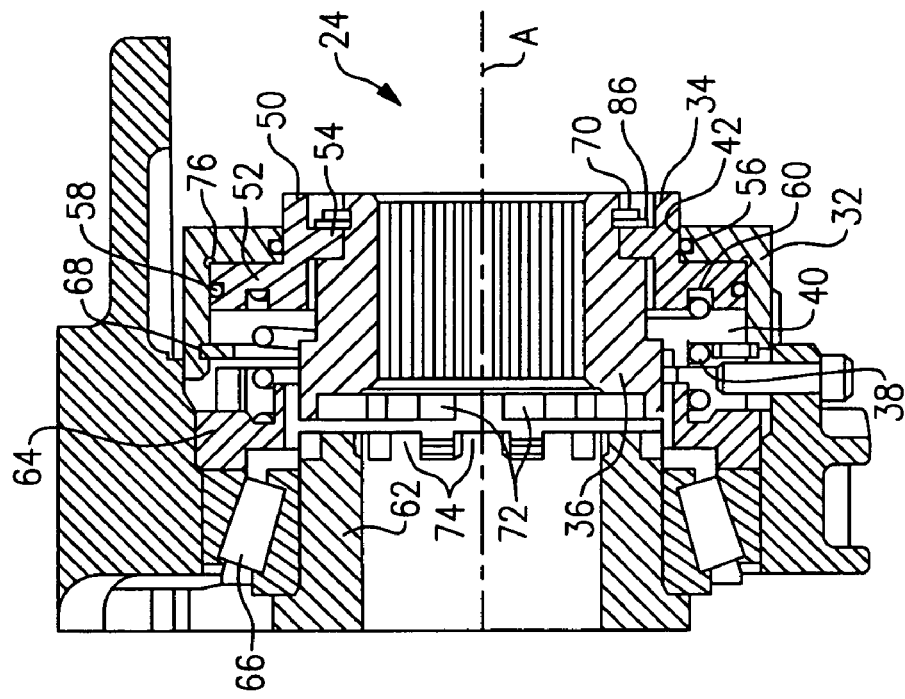
FIG. 5 is a cross-sectional view that shows the air actuated shift mechanism of FIG. 4 in a disengaged and unlocked position.
Figure 4:
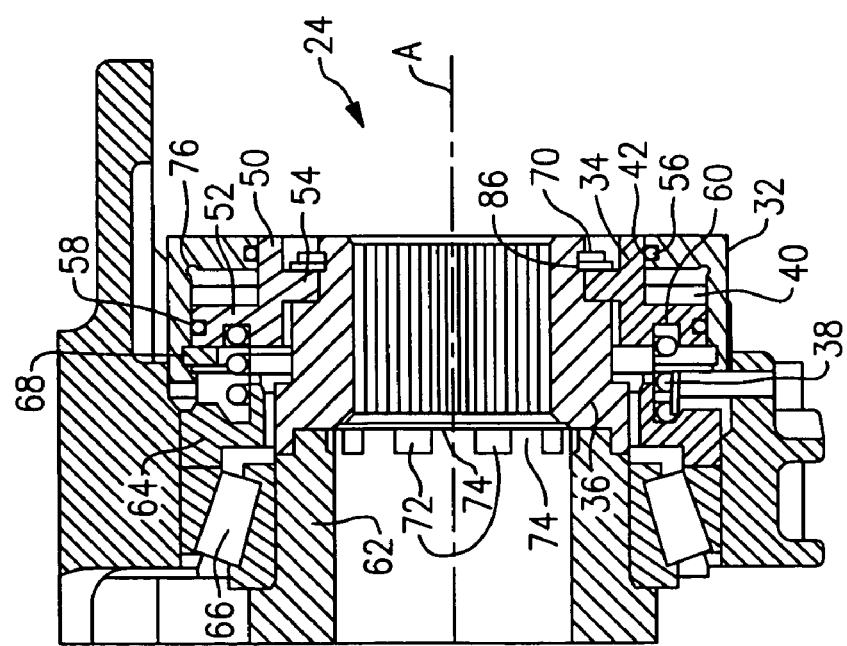
FIG. 4 is a cross-sectional view that shows the air actuated shift mechanism of FIGS. 2-3 in an engaged and locked position.
Figure 7:
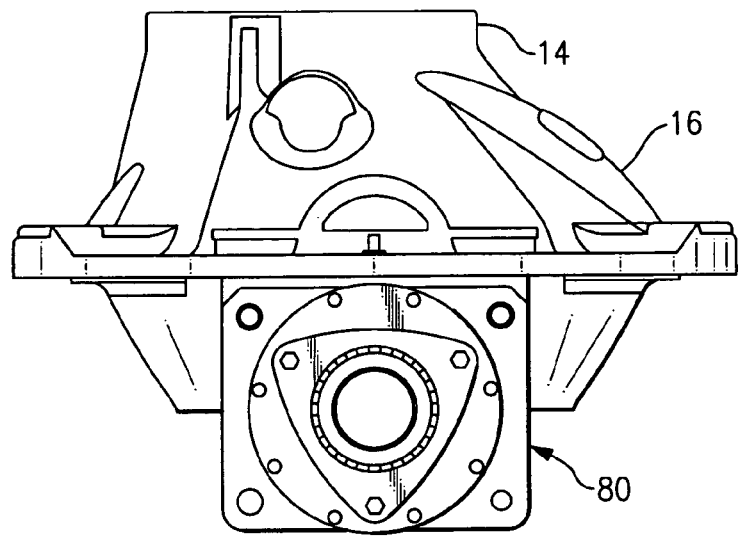
FIG. 7 shows a carrier and a second example of an air actuated shift mechanism incorporating the subject invention for a two-speed shifter.

As shown in FIGS. 4-6, the piston 34 includes a cylinder portion 50, an outwardly extending flange 52 that extends radially outwardly from the cylinder portion 50, and an inwardly extending flange 54 that extends radially inwardly from the cylinder portion 50. Preferably, the cylinder portion 50, the outwardly extending flange 52, and the inwardly extending flange 54 are all integrally formed together as a single piece component.

An outer surface of the cylinder portion 50 provides a sliding surface that engages a surface that defines the opening 42 in the cylinder 32. A first o-ring seal 56 is positioned at this sliding interface.

The outwardly extending flange 52 forms a piston portion that extends into the air chamber 40. A second o-ring seal 58 is provided at a sliding interface between an outermost surface of the outwardly extending flange 52 and an inner surface of the cylinder 32. The outwardly extending flange 52 includes a groove 60 formed in a surface facing a differential case 62. The resilient member 38 has one end received within this groove 60. An opposite end of the resilient member 38 reacts against an annular member 64 positioned immediately adjacent a differential bearing 66. A snap ring 68 is mounted within the air chamber 40 to provide a stop for the outwardly extending flange 52.

The inwardly extending flange 54 comprises a shift member that cooperates with the shift collar 36 to move the shift collar 36 along an axis A between an engaged position and a disengaged position. The inwardly extending flange 54 is held fixed relative to the shift collar 36 with a washer 86 and snap ring 70. This attachment interface allows the inwardly extending flange 54 to move the shift collar 36 back and forth along axis A between the engaged and disengaged positions.

The shift collar 36 includes a plurality of teeth 72 that engage a corresponding plurality of teeth 74 formed on the differential case 62. When the air chamber 40 is not pressurized, the resilient member 38 is biased to hold the shift collar 36 disengaged from the differential case 62 as shown in FIG. 5. When disengaged, the differential is unlocked and the axle shafts 20 (FIG. 1) are free to turn at different speeds relative to each other.

When the air chamber 40 is pressurized via port 76, the piston 34 shifts the shift collar 36 toward the differential case 62 via the inwardly extending flange 54. Thus, the piston 34 moves the teeth 72 of the shift collar 36 into engagement with the teeth 74 of the differential case 62 to engage or lock the differential as shown in FIG. 4. When the differential is locked, the axle shafts 20 are driven at the same speed. To return to the disengaged or unlocked position, the air chamber 40 is de-pressurized and the resilient member 38 returns the piston 34 to the initial position.

As shown in FIG. 6, to provide a completely sealed environment for the shift mechanism 24, an o-ring seal 78 is provided between the carrier 16 and the cylinder 32. In this configuration, the shift mechanism 24 provides a simple and effective way to pneumatically actuate a differential lock mechanism 30. The shift mechanism has fewer components than previous designs resulting in reduced cost, and is enclosed within the axle housing 14, which increases available packaging space for other vehicle components.

In another example shown in FIG. 7-11, a shift mechanism 80 is used to actuate a two-speed shifter (FIG. 7) that is incorporated into the carrier 16. The two-speed shifter cooperates with the drive gear assembly 18 (FIG. 1) to provide a high speed and a low speed output at the vehicle wheels 22.

Figure 8:
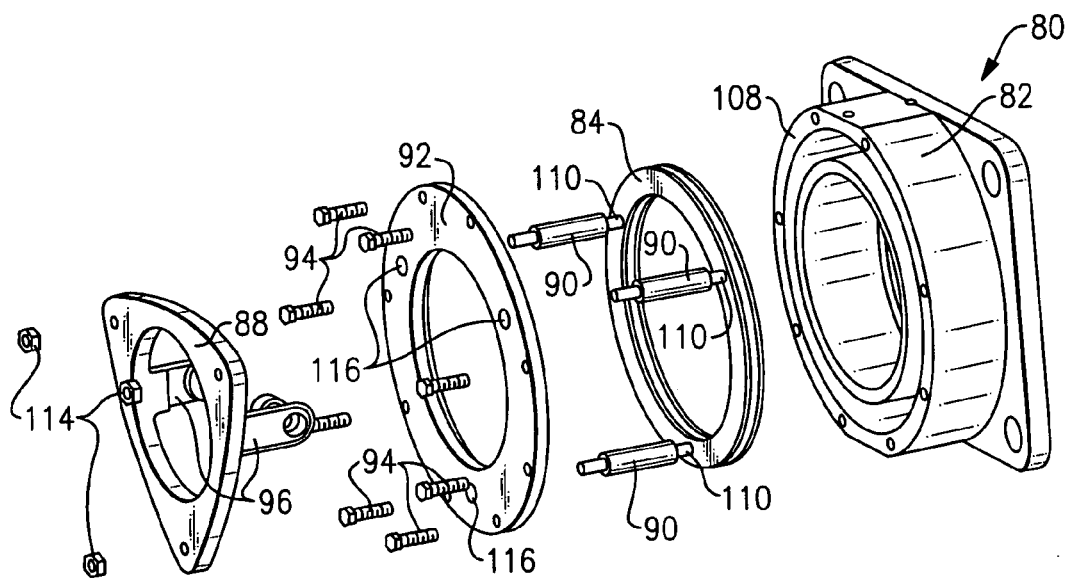
FIG. 8 is an exploded view of the air actuated shift mechanism of FIG. 7.

As shown in FIG. 8, the shift mechanism 80 for the two-speed shifter includes a lock plate 82, a piston 84, and a shift fork 88. Shift shafts 90 are secured to the shift fork 88 and piston 84. A cover 92 is attached with a plurality of fasteners 94 to the lock plate 82 to enclose the piston 84 within the lock plate 82.

The shift fork 88 includes arms 96 that are coupled to a sun gear 98 (FIGS. 9-10) that defines an axis of rotation R. The arms 96 are preferably fixed to opposing sides of the sun gear 98. Movement of the shift fork 88 is controlled by the piston 84, which moves the sun gear 98 back and forth along the axis of rotation R between engaged and disengaged positions. The sun gear 98 is comprised of a traditional sun gear as used in known two-speed shifters. The sun gear 98, when engaged and disengaged, operates in the same well-known manner as a sun gear in a traditional two-speed shifter. Thus, the use of the sun gear 98 in the two-speed shifter is known and will not be discussed in detail. In this example, the invention is directed to the shift mechanism 80 that is used to actuate and control shifting of the sun gear 98.

The lock plate 82 includes a base portion 100 held fixed within the axle housing 14, an inner circumferential wall 102 extending out from the base portion 100 and about the axis of rotation R, an outer circumferential wall 104 radially spaced from the inner circumferential wall 102, and an air chamber 106 formed between the inner 102 and outer 104 circumferential walls. The piston 84 is slidably received within the air chamber 106. The cover 92 is secured to an end face 108 of the lock plate 82 to enclose the piston 84 within the air chamber 106.

The shift shafts 90 have a first shaft end 110 coupled to the piston 84 and a second shaft end 112 coupled to the shift fork 88 with nuts 114. The shift shafts 90 extend through corresponding openings 116 in the cover 92. It should be understood that while three (3) shift shafts 90 are shown, fewer shift shafts or additional shift shafts could be utilized as needed.

A first o-ring 120 is positioned between the piston 84 and the outer circumferential wall 104. A second o-ring 122 is positioned between the piston 84 and the inner circumferential wall 102. A third o-ring 124 is used to seal each shift shaft 90 relative to the cover 92 (see FIG. 11), i.e. three o-rings 124 are utilized in the configuration shown. The o-rings 120, 122, and 124 cooperate to provide a completely sealed environment for the piston 84.

The base portion 100 of the lock plate 82 includes a center opening that defines an engagement surface 130. The engagement surface 130 could comprise splines or teeth for example. The engagement surface 130 is selectively moved into and out of engagement with the sun gear 98 to provide high and low speed output as needed. Thus, the lock plate 82 provides at least two important functions. The lock plate 82 itself engages with the sun gear 98, while additionally supporting the shift mechanism components.

The lock plate 82 includes a first port 132 and a second port 134, which are connected to the pressure source 26 (FIG. 1). When the first port 132 is pressurized, as shown in FIG. 9, the piston 84 shifts in a direction to the right along the axis of rotation R. As the piston 84 moves, the shift fork 88 pushes the sun gear 98 to the right bringing an engagement portion 140 of the sun gear 98 into engagement with the engagement surface 130 of the lock plate 82. This results in the engaged, locked position, which provides a low speed/high torque output.

When the second portion 134 is pressurized, as shown in FIG. 10, the piston 84 shifts in an opposite direction along the axis of rotation R, i.e. the piston 84 shifts to the left. As the piston 84 moves to the left, the shift fork 88 pulls the sun gear 98 out of engagement with the lock plate 82. This results in the disengaged, unlocked position, which provides a high speed and low torque output.

In this configuration, the shift mechanism 80 provides a simple and effective way to pneumatically actuate a two-speed shifter. The shift mechanism 80 has fewer components than previous designs resulting in reduced cost, and is enclosed within the axle housing 14, which increases available packaging space for other vehicle components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air shift mechanism for a drive axle comprising:
   a lock member having an engaged position and a disengaged position;
   an engageable member comprising a gear for a two-speed shifter, said gear defining an axis and being selectively engaged by the lock member to achieve said engaged position and provide a first axle function, said lock member being disengaged from said engageable member to achieve said disengaged position and provide a second axle function;
   a shift member that moves one of said lock member and said engageable member to provide said engaged position; and
   an air actuated piston that controls movement of said shift member, said air actuated piston being movable along said axis, and wherein said lock member, said engageable member, said shift member, and said air actuated piston are enclosed within an axle housing.

2. The air shift mechanism according to claim 1 wherein said lock member comprises a lock plate and said gear comprises a sun gear, and wherein said shift member moves said sun gear between said engaged and disengaged positions to provide said two-speed shifter.

3. The air shift mechanism according to claim 2 wherein said first axle function comprises a low speed output with said sun gear and said lock plate being in said engaged position and said second axle function comprises a high speed output with said sun gear and said lock plate being in said disengaged position.

4. The air shift mechanism according to claim 2 wherein said shift member comprises a shift fork that is coupled to said sun gear to move said sun gear along an axis between said engaged and said disengaged positions.

5. The air shift mechanism according to claim 1 wherein said air actuated piston is concentric with said gear.

6. The air shift mechanism according to claim 1 wherein said lock member defines an air chamber that receives said air actuated piston.

7. The air shift mechanism according to claim 6 wherein said lock member includes an engagement surface that is selectively engaged and disengaged with said gear.

8. The air shift mechanism according to claim 7 wherein said lock member comprises a lock plate having a base portion, an inner circumferential wall extending out from said base portion and an outer circumferential wall extending out from said base portion and radially spaced from said inner circumferential wall to define said air chamber between said inner and said outer circumferential walls, and wherein said air actuated piston is slidingly received within said air chamber.

9. The air shift mechanism according to claim 8 wherein said gear comprises a sun gear and wherein said base portion defines an internal center opening that provides said engagement surface, and wherein said engagement surface is selectively engaged and disengaged with said sun gear to respectively provide low and high speed capability.

10. The air shift mechanism according to claim 1 wherein said shift member comprises a shift fork with at least one arm that is coupled to said gear, and including at least one shift shaft that couples said shift fork to said air actuated piston.

11. An air shift mechanism for a drive axle comprising:
    a lock member having an engaged position and a disengaged position, wherein said lock member comprises a lock plate;
    an engageable member selectively engaged by the lock member to achieve said engaged position and provide a first axle function, said lock member being disengaged from said engageable member to achieve said disengaged position and to provide a second axle function, and wherein said engageable member comprises a sun gear;
    a shift member that moves said sun gear between said engaged and disengaged positions to provide a two-speed shifter, and wherein said shift member comprises a shift fork that is coupled to said sun gear to move said sun gear along an axis between said engaged and said disengaged positions; and
    an air actuated piston that controls movement of said shift member, wherein said lock member, said engageable member, said shift member, and said air actuated piston are enclosed within an axle housing, and wherein said lock plate includes a base portion fixed to the axle housing, an inner circumferential wall extending about said axis, an outer circumferential wall radially spaced from said inner circumferential wall, and an air chamber formed between said inner and said outer circumferential walls, and wherein said air actuated piston is slidably received within said air chamber.

12. The air shift mechanism according to claim 11 including a cover plate mounted to said lock plate to seal said air actuated piston within said air chamber.

13. The air shift mechanism according to claim 12 including a plurality of slide shafts wherein each slide shaft has a first end fixed to said shift member and a second end fixed to said air actuated piston.

14. A drive axle assembly comprising:
    an axle housing;
    a drive gear assembly enclosed within said axle housing, said drive gear assembly coupled to a pair of axle shafts for driving laterally spaced vehicle wheels; and
    an air shift mechanism enclosed within said axle housing and cooperating with said drive gear assembly, said air shift mechanism including
    a lock member having an engaged position and a disengaged position;
    an engageable member comprising a sun gear for a two-speed shifter, said sun gear defining an axis and being selectively engaged by said lock member to achieve said engaged position and provide a first axle function, said lock member being disengaged from said engageable member to achieve said disengaged position and provide a second axle function;
    a shift member that moves one of said lock member and said engageable member to provide said engaged position; and
    an air actuated piston that controls movement of said shift member, said air actuator piston being movable long said axis.

15. The drive axle assembly according to claim 14 wherein said lock member comprises a lock plate, and wherein said shift member moves said sun gear between said engaged and disengaged positions to provide said two-speed shifter, with said first axle function comprising a low speed output with said sun gear and said lock plate being in said engaged position and said second axle function comprising a high speed output with said sun gear and said lock plate being in said disengaged position.

16. The drive axle assembly according to claim 14 wherein said air actuated piston is concentric with said sun gear.

17. The drive axle assembly according to claim 14 wherein said lock member comprises a single-piece component defining an air chamber that receives said air actuated piston and which includes an engagement surface that is selectively engaged and disengaged with said sun gear.

18. The drive axle assembly according to claim 17 wherein said lock member comprises a lock plate having a base portion, an inner circumferential wall extending out from said base portion and an outer circumferential wall extending out from said base portion and radially spaced from said inner circumferential wall to define said air chamber between said inner and said outer circumferential walls, and wherein said air actuated piston is slidingly received within said air chamber.

19. The drive axle assembly according to claim 18 wherein said base portion defines an internal center opening that provides said engagement surface, and wherein said engagement surface is selectively engaged and disengaged with said sun gear to respectively provide low and high speed capability.

20. The air shift mechanism according to claim 14 wherein said shift member comprises a shift fork with at least one arm that is coupled to said sun gear, and including at least one shift shaft that couples said shift fork to said air actuated piston.

21. A drive axle assembly comprising:
an axle housing;
a drive gear assembly enclosed within said axle housing, said drive gear assembly coupled to a pair of axle shafts for driving laterally spaced vehicle wheels; and
an air shift mechanism enclosed within said axle housing and cooperating with said drive gear assembly, said air shift mechanism including
a lock member having an engaged position and a disengaged position wherein said lock member comprises a lock plate;
an engageable member selectively engaged by said lock member to achieve said engaged position and provide a first axle function, said lock member being disengaged from said engageable member to achieve said disengaged position and provide a second axle function, and wherein said engageable member comprises a sun gear;
a shift member that moves one of said lock member and said engageable member to provide said engaged position, and wherein said shift member moves said sun gear between said engaged and disengaged positions to provide a two-speed shifter, with said first axle function comprising a low speed output with said sun gear and said lock plate being in said engaged position and said second axle function comprising a high speed output with said sun gear and said lock plate being in said disengaged position; and
an air actuated piston that controls movement of said shift member wherein said shift member comprises a shift fork that is coupled to said sun gear to move said sun gear relative to said lock plate along an axis between said engaged and said disengaged positions, and wherein said lock plate includes a base portion fixed to said axle housing, an inner circumferential wall extending about said axis, an outer circumferential wall radially spaced from said inner circumferential wall, and an air chamber formed between said inner and said outer circumferential walls, and wherein said air actuated piston is slidably received within said air chamber.

* * * * *

UNITED STATES PATENT AND TRADEMARK OFFICE
CERTIFICATE OF CORRECTION

| | | |
|---|---|---|
| PATENT NO. | : 7,524,260 B2 | Page 1 of 1 |
| APPLICATION NO. | : 11/453209 | |
| DATED | : April 28, 2009 | |
| INVENTOR(S) | : Correia et al. | |

It is certified that error appears in the above-identified patent and that said Letters Patent is hereby corrected as shown below:

Claim 14, Column 6, Line 63: Change "actuator" to "actuated"

Claim 14, Column 6, Line 64: Change "long" to "along"

Signed and Sealed this

Seventh Day of July, 2009

JOHN DOLL
*Acting Director of the United States Patent and Trademark Office*